Patented May 26, 1931

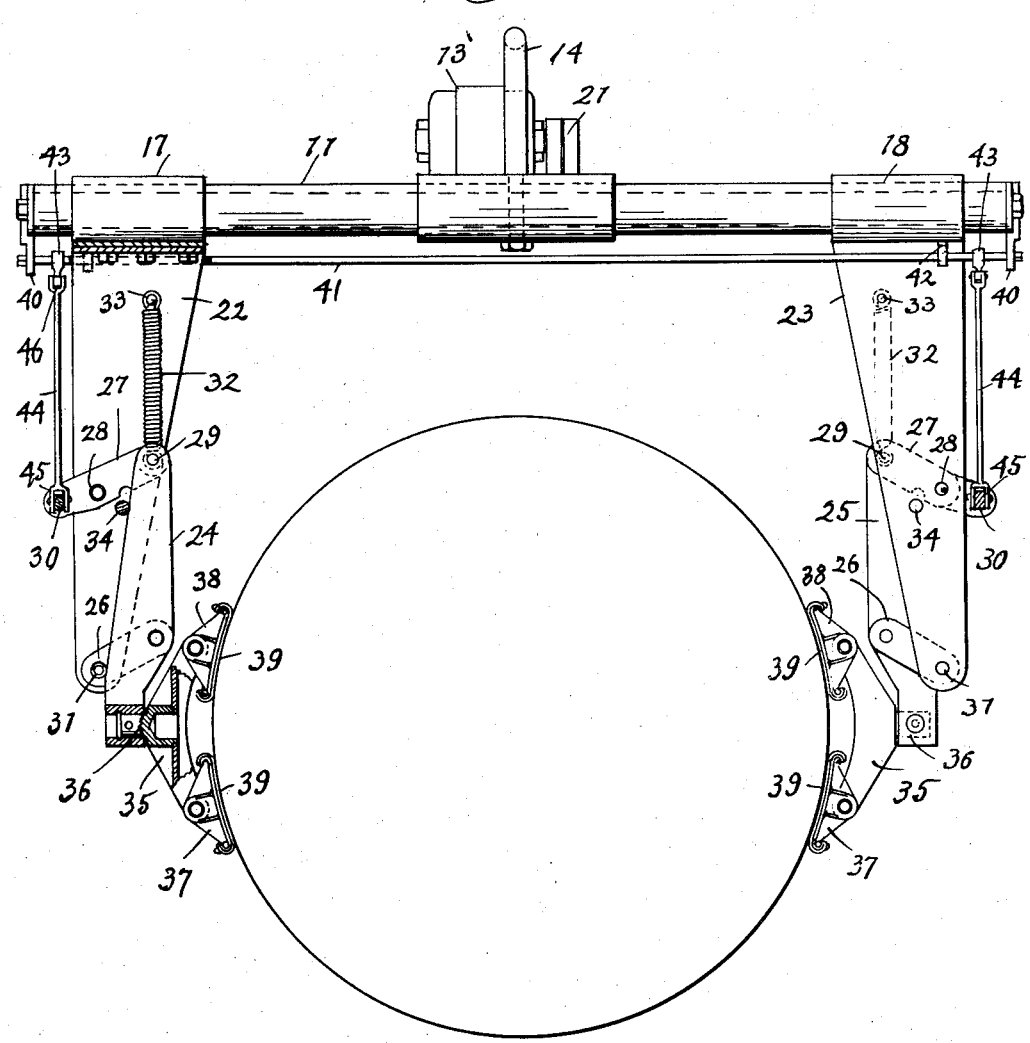

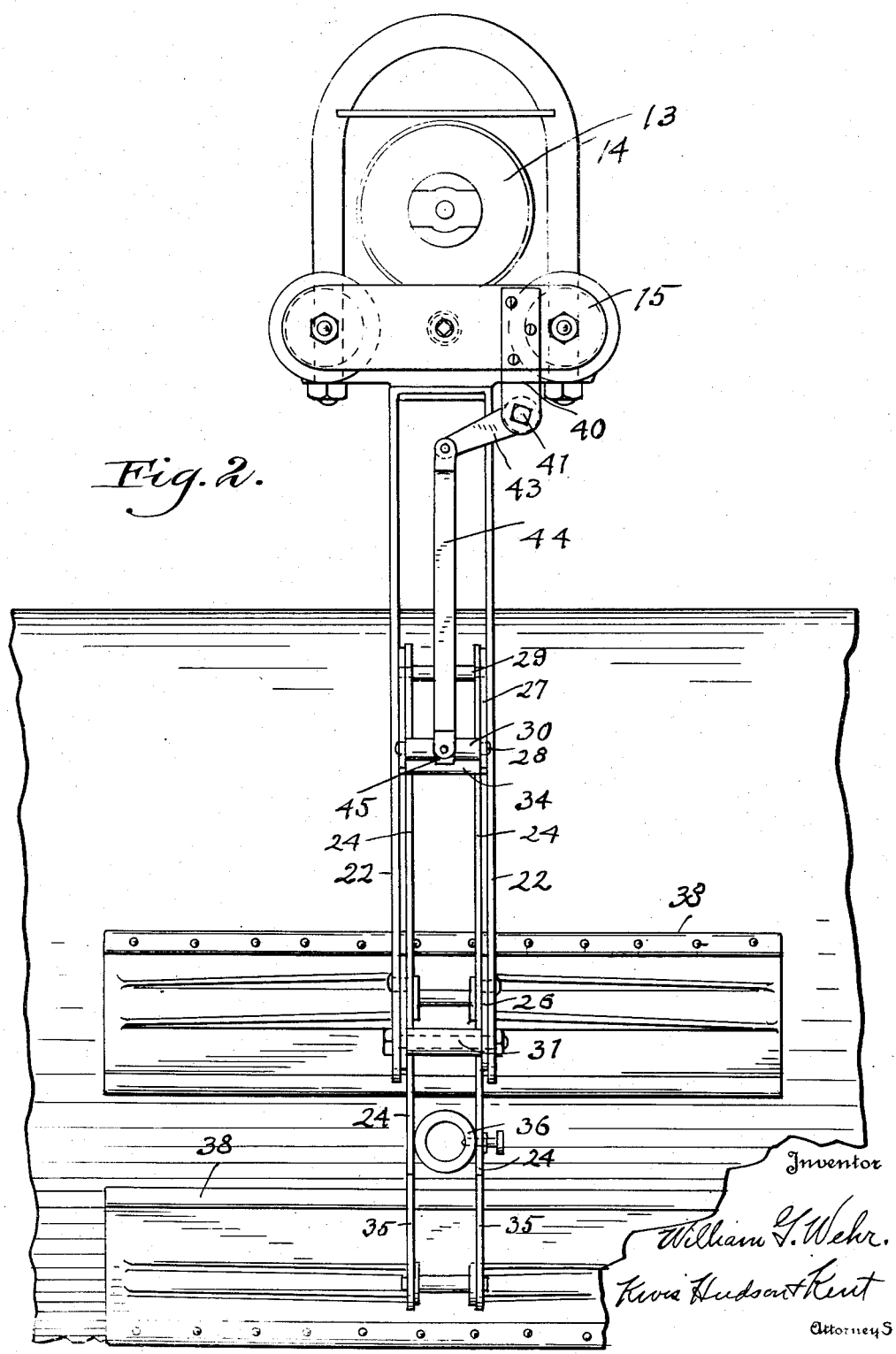

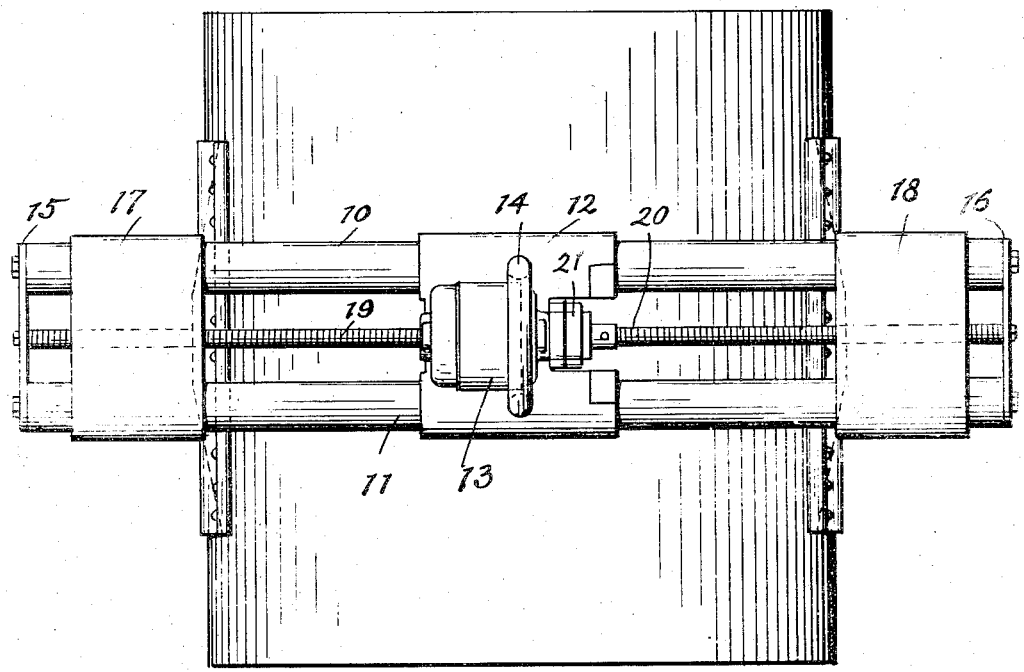

1,807,360

UNITED STATES PATENT OFFICE

WILLIAM G. WEHR, OF EAST CLEVELAND, OHIO, ASSIGNOR TO THE CLEVELAND CRANE & ENGINEERING COMPANY, OF WICKLIFFE, OHIO, A CORPORATION OF OHIO

PAPER ROLL HANDLING MECHANISM

Application filed March 17, 1928. Serial No. 262,506.

This invention relates to a mechanism for handling rolls of paper, bales, boxes or the like and similar articles.

An object of the invention is to provide a grab mechanism for handling rolls of paper, bales, boxes, or the like, that is efficient, expeditious in its operation, readily manipulated, composed of a relatively few number of parts of simple design, and economical to manufacture.

Another object is to provide a grab mechanism of this nature that may engage and lift the work, when the latter is standing either on end or on its side, and then permit the same to be swung into the opposite position.

Other objects and advantages will become apparent as the description proceeds.

An embodiment of the invention is illustrated in the accompanying drawings, wherein Figure 1 is a side elevational view of the mechanism, a portion of one equalizing jaw being shown in section.

Figure 2 is an end elevational view taken from the left of Fig. 1, and

Figure 3 is a top plan view.

In the embodiment illustrated the mechanism is shown in engagement with a roll of news print paper but it should be recognized that it might equally as well be used for handling bales, boxes, barrels, or similar objects. The mechanism comprises two supporting shafts or members 10 and 11 arranged in spaced parallel relationship and having a motor base 12 secured fixedly thereto at their middle portions. The motor base 12 supports upon its upper surface an actuating motor 13 and a suspension yoke 14 adapted to be engaged by any suitable hoisting mechanism, such as a mono-rail carrier. The opposite ends of the shafts or members 10 and 11 are connected together by bridging or connecting plates 15 and 16. Slidably mounted upon the shafts and intermediate the motor base and the ends of the shafts are bearings 17 and 18. These bearings are each provided through their middle portion with a threaded bore adapted to receive the screw shafts 19 or 20, as the case may be. The outer ends of these screw shafts are rotatably journalled in the connecting plates 15 and 16, respectively. The actuating motor 13 is adapted to drive a drive shaft (not shown) by means of gearing and a clutch mechanism arranged in the casing 21. The shafts 19 and 20 are suitably connected to opposite ends of this drive shaft. While the details of the clutch mechanism have not been shown, the arrangement thereof should be such that when the motor is operating in one direction the drive shaft will be actuated by a frictional driving connection and when the motor is operating in the opposite direction by a positive driving connection, such arrangement being shown in my copending application Serial No. 262,505, filed March 17, 1928. In this way the screw shafts 19 and 20 may be driven frictionally in one direction of axial rotation and positively in the other, it being contemplated to so construct the mechanism that the shafts 19 and 20 will be positively driven when moving the slidable bearings 17 and 18 outwardly or away from each other, and frictionally driven when the same are approaching each other.

The movement of the bearings 17 and 18 upon the supporting shafts 10 and 11, by means of the threaded shafts 19 and 20, will be perfectly apparent, since the screw shafts each extend through the threaded bore in its corresponding slidable bearing. Directly bolted or otherwise secured to each of the sliding bearings are downwardly extending parallel arms 22 and 23. Arms 24 and 25 are connected respectively to the arms 22 and 23 by means of links 26 and 27. The links 27 are pivoted intermediate their ends to the arms 22 and 23, respectively, upon pivot pins 28. The inner end of each link 27 is pivotally connected at 29 to the arms 24 and 25. The opposite ends of the links 27 are provided with pins 30, for a purpose later to be described. The links 26 are pivoted at their outer ends upon pivot pins 31 to the lower end of the arms 22 and 23. The opposite ends of these links are pivoted to the arms 24 and 25, respectively. A spring 32 is connected to the upper end of the arms 24 and 25 and to a pin 33 carried by each of the arms 22 and 23. The function of the spring 32 is to normally rock the links 26 and 27 upwardly about their pivots and thereby to similarly move the arms 24 and 25 in a like direction.

Pins 34 carried by the arms 22 and 23 are adapted to engage in notches in the links 27 so as to limit the downward movement of such members and correspondingly the downward movement of the arms 24 and 25. The arms 24 and 25, at a point below their point of connection with the links 26, are provided with means for permitting a swivel connection with equalizing jaws 35. The swivel connection just referred to may be effected in any preferred manner as, for example, by the use of pins 36, as shown. The opposite ends of the equalizing jaws 35 have swivelled thereto work engaging shoes 37 and 38. These shoes are provided with a facing 39 of rubber or other suitable material.

The connecting or bridging plates 15 and 16, at the opposite ends of the supporting shafts 10 and 11, have downwardly extending portions 40 within which a squared shaft 41 is rotatably journaled. This shaft is likewise carried by bearings 42 arranged upon the slidable bearings 17 and 18 and having a sliding fit with the shaft. Link members 43 are arranged upon the shaft 41 intermediate the parts 40 and the sliding bearings 17 and 18 at both of the opposite ends of the mechanism and although having a sliding fit upon the shaft 41, will, when they are rocked or rotated, impart a similar movement to the shaft.

Rods 44, having yokes 45 and 46 at their opposite ends, are arranged between the pins 30 on the links 27 and the links 43 just referred to. The yokes 45 of these rods are adapted to be pivotally connected to the pins 30, while the yokes 46 are similarly connected to the links 43.

In operation the actuating motor is operated so as to move the slidable bearings 17 and 18 outwardly of the supporting shafts 10 and 11 a sufficient distance to enable the equalizing jaws to pass on opposite sides of the roll of paper or other work to be handled, when the mechanism is lowered into work engaging position. At this time the arms 24 and 25 will be held in elevated position because of the springs 32. After the mechanism has been brought into work engaging position the operation of the motor is reversed and the slidable bearings caused to approach each other. In turn the equalizing jaws 35 are brought nearer together until the engaging shoes 37 and 38 of each of the jaws engage the work. Further inward movement of the slidable bearings 17 and 18 will be arrested because the screw shafts 19 and 20 are being driven in this direction by means of a frictional drive and the overload thus caused will create a slippage in the clutch mechanism.

This slippage will prove very advantageous where the mechanism is being used for handling fragile crates or boxes. It should be understood that as the slidable bearings 17 and 18 move inwardly and outwardly on the supporting shafts 10 and 11 that the link mechanism heretofore described, and attached to the arms 22 and 23, have a similar movement, while the links 43 slide inwardly and outwardly on the shaft 41. The mechanism having been brought to a position where the engaging shoes are in engagement with the work, the hoist is operated and the mechanism in its entirety is raised. This causes the arms 24 and 25 to move downwardly, because of the engagement with the work by the equalizing jaws, and in turn to swing the links 26 and 27 about their pivots until the links 27 have engaged the pins 34. It will be noted that the pivotal movement of the links 26 and 27 tend to force the arms 24 and 25 inwardly toward the work and hence to cause the equalizing jaws and engaging shoes to engage the same with great force. Supposing the work to have been on end, when first engaged by the mechanism and lifted thereby, it will be perfectly clear that it may be swung to the opposite position because of the swivel connection between the jaws 35 and the arms 24 and 25. In this manner the work may be picked up originally in either the on end position or the on side position and then deposited in the desired place in the opposite position, if desirable. Because of the shaft 41 and its connection through the rods 44 with the links 27 it will be seen that the entire gripping portion of the mechanism will be corelated and the corresponding parts moved in unison.

While the form illustrated and described is the preferred embodiment of the invention, it should be understood that the invention is not to be limited thereto, since it contemplates such modifications and adaptations as fall within the scope of the following claims.

Having thus described my invention what I claim is:

1. A handling mechanism comprising supporting members, members slidably mounted on said supporting members for relative movement toward and away from each other, and work engaging means movable bodily with said last mentioned members and connected thereto for independent relative movement into work supporting position as the work is being lifted.

2. A grab mechanism comprising supporting members, bearing members slidable on said supporting members for relative movement toward and away from each other, jaws adapted to engage the work, and means for connecting said jaws to said bearing members for positive movement therewith and for independent relative movement into work supporting position as the work is being lifted.

3. In a grab mechanism, supporting members, bearing members slidable on said supporting members for relative movement toward and away from each other, jaws adapted to engage the work, and means for connecting said jaws to said bearing members for positive movement therewith and for independent relative movement into work supporting position as the work is being lifted, said means including pivoted links operatively connected to said bearing members and said jaws.

4. In a grab mechanism, supporting means, bearing members slidable on said supporting members for relative movement toward and away from each other, jaws adapted to engage the work, and means for connecting said jaws to said bearing members for positive movement therewith and for independent relative movement into work supporting position as the work is being lifted, said means including arms associated with said bearing members and links pivotally connected to said arms and operatively connected to said jaws.

5. In a grab mechanism, supporting members, bearing members movable on said supporting members for relative movement toward and away from each other, jaws adapted to engage the work, and means for connecting said jaws to said bearing members for positive movement therewith and for independent relative movement into work supporting position as the work is being lifted, said means including arms associated with said bearing members, and swivelly connected to said jaws, and links pivotally connected to said arms and to said bearing members.

6. In a grab mechanism, supporting members, bearing members slidable on said supporting members for relative movement toward and away from each other, jaws adapted to engage the work, means for connecting said jaws to said bearing members for positive movement therewith and for independent relative movement into work supporting position as the work is being lifted, said means permitting equalizing movement of the jaws and causing the same to be moved in unison.

7. A grab mechanism comprising supporting members, slidable bearings arranged on said members and adapted to be moved toward and away from each other by a common actuating means, depending arms secured to each of said bearings, a plurality of links pivotally connected to each of said arms, jaws adapted to engage the work, and means swivelled to said jaws for connecting each jaw to the links on said arms.

8. A grab mechanism comprising a pair of parallel supporting members, slidable bearings arranged on said members and adapted to be moved toward and away from each other by a common actuating means, depending arms secured to each of said bearings, a plurality of pivoted links secured to each of said arms, an arm pivotally connected to the links on said first named arms, and jaws swivelled to the lower end of said last named arms and adapted to engage the work.

9. A grab mechanism comprising a pair of parallel spaced supporting members, bearing members slidably arranged thereon and adapted to move toward and away from each other, an actuating means for said bearing members, downwardly extending arms secured to each of said bearing members, a plurality of links pivotally connected to said arms adjacent their lower ends, an arm pivotally connected to the links on each of said first named arms, jaws swivelled to said last named arms and adapted to engage the work, and means on said first named arms for limiting the movement of said last named arms in one direction.

10. A grab mechanism comprising supporting members, slidable bearings arranged thereon and adapted to move toward and away from each other, a common actuating means arranged intermediate said bearings for effecting movement thereof, depending arms rigidly secured to each of said bearings, a plurality of links pivotally connected to each of said arms, arms pivotally connected to each of the links upon each of said first named arms, jaws swivelled to said last named arms and adapted to engage the work, means for equalizing the movement of said last named arms, and means for normally maintaining said last named arms in their uppermost positions.

11. A grab mechanism comprising supporting means, slidable bearings arranged thereon and adapted to be moved toward and away from each other, actuating means for said bearings arranged upon said supporting means intermediate the former, links pivotally connected to an arm depending from each of said bearings, arms pivotally connected to the links upon each of said depending arms, jaws having swivelled work engaging feet swivelled to said last named arms, means for limiting the downward movement of said jaws, and means for equalizing the movement of said jaws.

In testimony whereof, I hereunto affix my signature.

WILLIAM G. WEHR.